US010391906B2

(12) United States Patent
Mao et al.

(10) Patent No.: US 10,391,906 B2
(45) Date of Patent: Aug. 27, 2019

(54) SLIDING MECHANISM FOR A VEHICLE FLOOR CONSOLE AND A FLOOR CONSOLE SLIDING ARMREST ASSEMBLY

(71) Applicant: Ford Global Technologies, LLC, Dearborn, MI (US)

(72) Inventors: Mike Mao, Ninjing (CN); Shin Wang, Nanjing (CN); Mandy Jiang, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 8 days.

(21) Appl. No.: 15/433,283

(22) Filed: Feb. 15, 2017

(65) Prior Publication Data

US 2017/0259714 A1  Sep. 14, 2017

(30) Foreign Application Priority Data

Mar. 9, 2016  (CN) .......................... 2016 1 0133139

(51) Int. Cl.
*B60N 2/75*  (2018.01)

(52) U.S. Cl.
CPC ............. *B60N 2/793* (2018.02); *B60N 2/773* (2018.02)

(58) Field of Classification Search
CPC ....... B60N 2/773; B60N 2/793; B60N 2/4646
USPC ....... 296/24.34, 65.13, 65.14, 100.03, 26.09, 296/165, 26.13
See application file for complete search history.

(56) References Cited

U.S. PATENT DOCUMENTS

| 4,693,508 A * | 9/1987 | Pettit ......................... B60J 7/041 296/100.03 |
| 7,530,615 B2 * | 5/2009 | Ogura ........................ B60R 7/04 296/24.34 |
| 7,731,258 B2 * | 6/2010 | Bazinski ................ B60N 2/793 296/37.8 |

FOREIGN PATENT DOCUMENTS

CN  204161221 U  2/2015

* cited by examiner

*Primary Examiner* — Joseph D. Pape
*Assistant Examiner* — Dana D Ivey
(74) *Attorney, Agent, or Firm* — Vichit Chea; Price Heneveld LLP (57) ABSTRACT

A sliding mechanism for a vehicle floor console is disclosed. The sliding mechanism comprises a base portion including a panel and a sliding groove, the sliding groove being positioned at the end of the panel and having an opening, and a guide portion including a guide rail disposed in the sliding groove and being slidable in the sliding groove. The sliding groove includes first and second surfaces positioned along the first direction, having angles with the first direction, connected to each other and enclosing a first sliding portion of the guide rail.

19 Claims, 4 Drawing Sheets

SLIDING MECHANISM FOR A VEHICLE FLOOR CONSOLE AND A FLOOR CONSOLE SLIDING ARMREST ASSEMBLY

FIELD OF THE INVENTION

The present application generally relates to floor consoles on vehicles, and more particularly relates to a sliding mechanism for a floor console and a floor console sliding armrest assembly.

BACKGROUND OF THE INVENTION

A vehicle floor console usually includes a console body having a storage space for storing items and a console cover positioned above the console body that may be used as an armrest. It is desired to provide a console cover which could slide relative to the console body along a longitudinal direction of the vehicle so that the users with different heights and arm lengths can be accommodated.

U.S. Pat. No. 7,731,258 B2 discloses a center floor console sliding armrest. The sliding movement of the armrest is realized via the sliding of the end portions of the guide plate within the rail.

SUMMARY OF THE INVENTION

According to one aspect of the present disclosure, a sliding mechanism for vehicle floor console is disclosed. The sliding mechanism comprises a base portion including a panel and a sliding groove positioned at an end of the base panel and comprising an opening. The sliding mechanism also includes a guide portion comprising a guide rail positioned and slidable in the sliding groove. The sliding groove includes first and second angled surfaces connected to each other and configured to at least partially enclose a first sliding portion of the guide rail.

In one embodiment, the first and second surfaces are positioned along a first direction, wherein the first surface has a first angle relative the first direction and the second surface has a second angle relative to the first direction, and wherein the first direction is the width direction of the base portion, and at least one of the first angle and the second angle is less than ninety degrees (90°).

In one embodiment, the sliding groove includes a third surface and a fourth surface positioned along the first direction and opposite to the first and the second surfaces, respectively. The third surface has a third angle relative to the first direction and the fourth surface has a fourth angle relative to the first direction. The third surface and the fourth surface are connected to each other and is configured to substantially enclose and/or contact a second sliding portion of the guide rail.

In one embodiment, the first surface and the third surface are positioned adjacent to the end of the base portion, the second surface and the fourth surface are positioned adjacent to the panel of the base portion, the sliding groove further includes an intermediate surface connecting the first surface and the third surface and the intermediate surface is positioned spaced apart from the guide rail along the first direction.

In one embodiment, the first surface and the second surface are connected to form an angle and a connecting point is spaced apart from the guide rail.

In one embodiment, the guide portion includes an intermediate portion, the guide rail includes a body connected with the intermediate portion, the first sliding portion protrudes from the body along a second direction different with the first direction, the first sliding portion is formed with a first side and a second side opposite to the first side and the first side and second side contact the first surface and the second surface of the sliding groove, respectively.

In one embodiment, the guide rail is a one-piece structure formed integrally. In one embodiment, the guide rail is composed of resilient material.

In one embodiment, the base portion includes another sliding groove at another end of the base panel. The guide portion includes another guide rail received in the another sliding groove and an intermediate portion is connected with the two guide rails.

According to an additional one or more embodiments, a floor console sliding armrest assembly for vehicle is disclosed. The floor console sliding armrest assembly comprises a floor console body; an armrest slidable relative to the floor console body; and a sliding mechanism connected with the floor console body and the armrest. The slide mechanism includes a base portion including a panel and a sliding groove having an opening; a guide portion including a guide rail extending through the opening along a width direction substantially parallel to the panel and being slidably received within the sliding groove. The sliding groove includes a first surface and a second surface having angles relative to the first direction. The first surface and the second surface are connected to each other and partially enclose and/or contact a first side portion of the guide rail. The guide rail is secured to the floor console body.

According to yet another aspect, a sliding mechanism for a vehicle floor console is disclosed. The sliding mechanism comprises a base portion including a panel and a sliding groove at its end. The sliding groove includes a cavity having an upper portion and a lower portion and having an opening under the panel. The upper portion includes a first surface and a second surface opposite to the first surface and adjacent to the panel and the first and second surface has an angle to the panel. The second surface is positioned adjacent to the panel. The sliding mechanism further includes a guide portion including an intermediate portion and a guide rail received with the sliding groove and having a first side and a second side. The first side is adjacent to the first surface of the sliding groove and the second side is adjacent to the second surface of the sliding groove. The base portion is slidable along the guide portion, and the first surface of the sliding groove restricts the movement of the guide rail along the first direction substantially parallel to the panel while the second surface of the sliding groove restricts the movement of the guide rail along a direction opposing to the first direction, and the first surface and the second surface together defines the movement of the guide rail along a second direction substantially perpendicular to the first direction.

In one embodiment, the panel of the base portion is substantially parallel to the intermediate portion of the guide portion.

In one embodiment, the first side substantially contacts the first surface of the sliding groove and the second side substantially contacts the second surface of the sliding groove. In one embodiment, the first surface and the second surface of the sliding groove are symmetrical as relative to an axis substantially perpendicular to the first direction.

In one embodiment, the lower portion of the sliding groove includes a third surface and a fourth surface opposed with each other and being angulated to the panel, the fourth surface is positioned adjacent to the panel, the guide rail includes a third side substantially contacting the third surface of the sliding groove and a fourth side substantially contacting the fourth surface of the sliding groove, and the third surface of the sliding groove restricts the movement of the guide rail along the first direction while the fourth surface of the sliding groove restricts the movement of the guide rail along a direction opposing to the first direction, and the third surface and the fourth surface together restrict the movement of the guide rail along a direction opposite to the second direction.

In one embodiment, the third surface and the fourth surface of the sliding groove are symmetrical as relative to an axis substantially perpendicular to the first direction.

In one embodiment, the upper portion and the lower portion of the sliding groove are symmetrical as relative to an axis substantially parallel to the first direction.

In one embodiment, the sliding groove further includes an intermediate surface connecting the first surface and the third surface and the intermediate surface is positioned spaced apart from the guide.

In one embodiment, the guide rail is a one-piece structure formed integrally. In one embodiment, at least part of the cross-section of the guide rail has an oval or a round shape.

It should be understood that the above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

One or more advantageous features as described herein will be readily apparent from the following detailed description of one or more embodiments when taken in connection with the accompanying drawings.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. As referenced in the figures, the same or similar reference numerals are used to refer to the same or similar components. In the following description, various operating parameters and components are described for different constructed embodiments. These specific parameters and components are included as examples and are not meant to be limiting. Therefore, specific structural and functional details disclosed herein are not to be interpreted as limiting, but merely as a representative basis for teaching one skilled in the art to variously employ the present invention.

The sliding mechanism of a console of the present disclosure is advantageous in that the sliding groove and guide rail are restricted in more than one direction to provide close fitting, and thus improving the NVH performance. Further, the sliding mechanism can be easily assembled.

FIGS. 1-3C illustratively depict a sliding mechanism 200 for a vehicle floor console 10, according to one embodiment. The sliding mechanism 200 comprises a base portion 210 and a guide portion 220. The base portion 210 includes a panel 215 and a sliding groove 240. The sliding groove 240 is positioned at an end 216 of the base portion 210 and includes an opening 230. The guide portion 220 includes a guide rail 250 extending through the opening 230 along a first direction H. The guide rail 250 is received within the sliding groove 240 and is slidable in the sliding groove 240. The sliding groove 240 includes a first surface 360 and a second surface 370 positioned along the first direction H. Each of the first and second surfaces 360, 370 forms an angle with the first direction H, respectively. The first surface 360 and the second surface 370 are connected to each other and substantially enclose or partially enclose and/or contact a first sliding portion 320 of the guide rail 250. In some embodiments, the first surface 360 and/or the second surface 370 may contact the first sliding portion 320. Contacting as used in this application may refer to touching at points, touching along a line or touching between two surfaces.

For illustration purpose, the sliding mechanism 200 is depicted with reference to a vehicle floor console herein. However, the sliding mechanism 200 may be used at other locations of the vehicle such as, including but not limited to, a rear seat armrest, a door, and a control panel. In addition, the sliding mechanism 200 may be utilized in a ship, an airplane, and a home or a commercial storage bin, for example.

Figure 1:
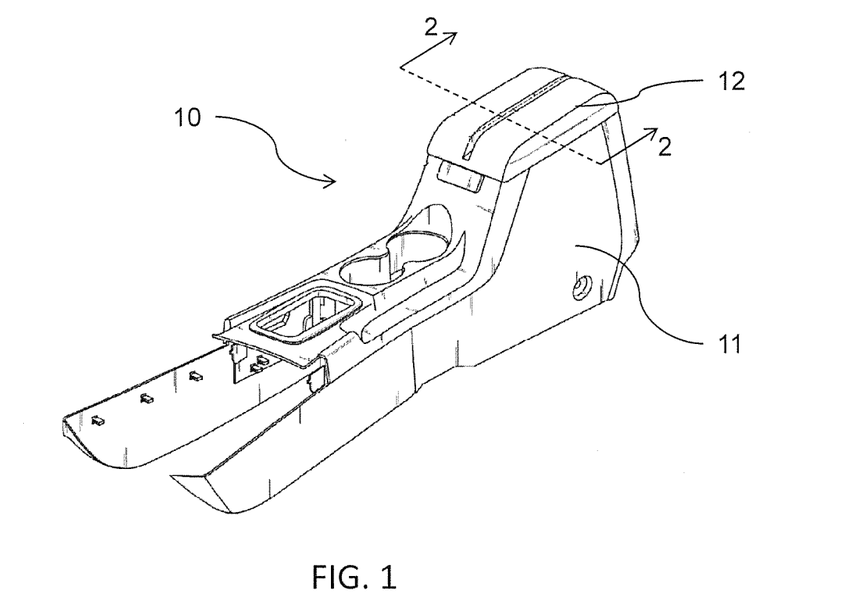
FIG. 1 is a perspective view of a vehicle floor console armrest assembly according to one embodiment of the present disclosure.

Referring to FIG. 1, a vehicle floor console armrest assembly 10 may be located in the middle of the vehicle and between a driver seat and a front passenger seat. The floor console armrest assembly 10 may include a floor console body 11 and an armrest 12. The armrest 12 may be slidable relative to the floor console body 11 along the longitudinal direction of the vehicle, thus providing support to arms for users with various arm sizes.

Figure 2:
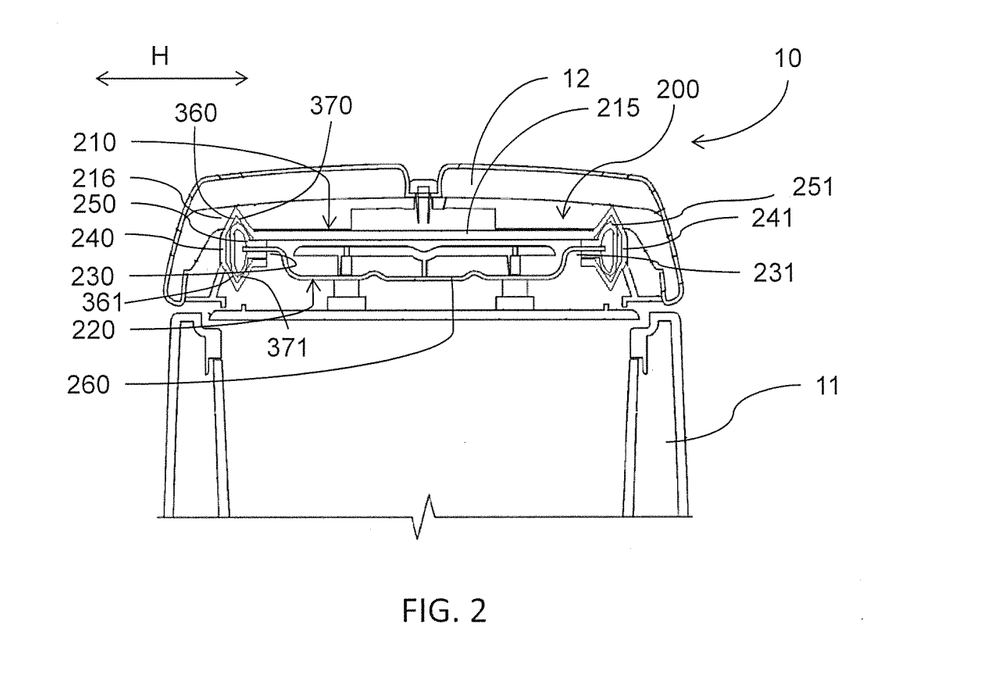
FIG. 2 is a cross-sectional view taken through line 2-2 of FIG. 1 illustrating part of the vehicle floor console.

FIG. 2 shows a cross-sectional view of part of the vehicle floor console 10 as referenced in FIG. 1 along line 2-2, illustratively depicting the floor console armrest assembly 10 and the sliding mechanism 200. The sliding mechanism 200 includes a base portion 210 and a guide portion 220. The sliding mechanism 200 is shown positioned below the armrest 12 and above the floor console body 11. For illustration purposes, the base portion 210 of the sliding mechanism 200 is shown as secured to the armrest 12 while the guide portion 220 is shown as secured to the floor console body 11 in FIG. 2. As detailed herein elsewhere, the base portion 210 may slide relative to the guide portion 220. Thus, the armrest 12 may slide relative to the floor console body 11 accordingly to provide various support positions for a user's arm. In other embodiments, the floor console body 11, the armrest 12, and the sliding mechanism 200 may be of other connection modes. For example, the floor console body 11 may be connected to the base portion 210 and the armrest 12 may be connected to the guide portion. Moreover, the connection or coupling among the floor console body 11, the armrest 12, and the sliding mechanism 200 may be achieved via various methods known in the art, such as clip, bolt, screw, and bonding, for example.

Figure 3A:
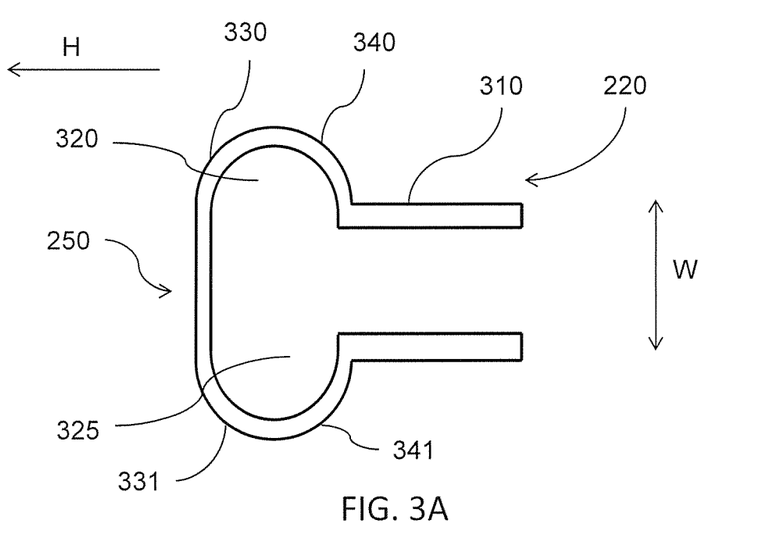
FIG. 3A is an enlarged cross-sectional view of the guide rail as referenced in FIG. 2.
Figure 3B:
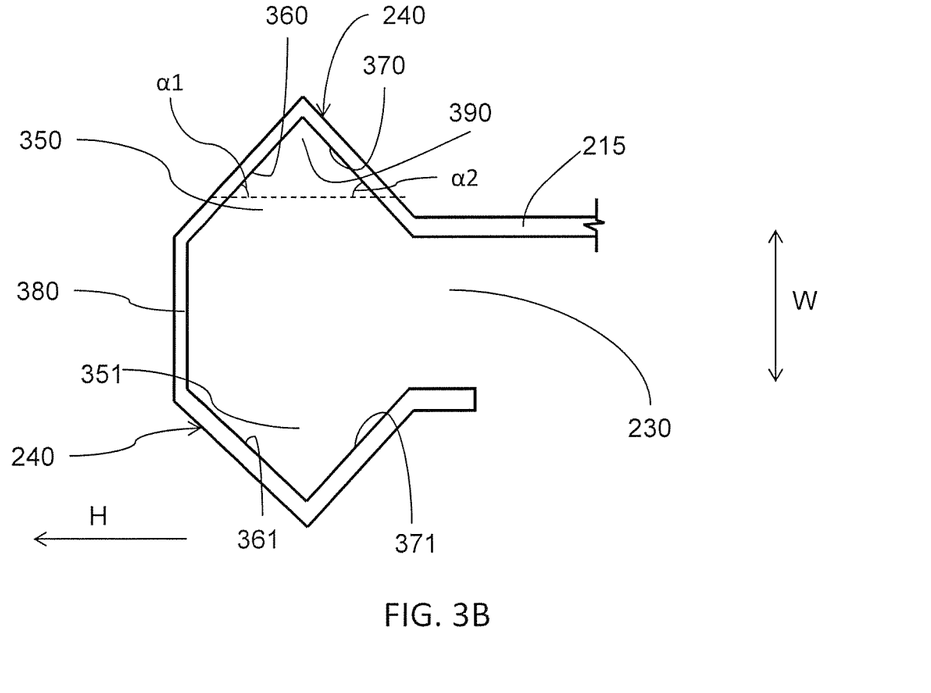
FIG. 3B is an enlarged cross-sectional view of the sliding groove as referenced in FIG. 2.
Figure 3C:
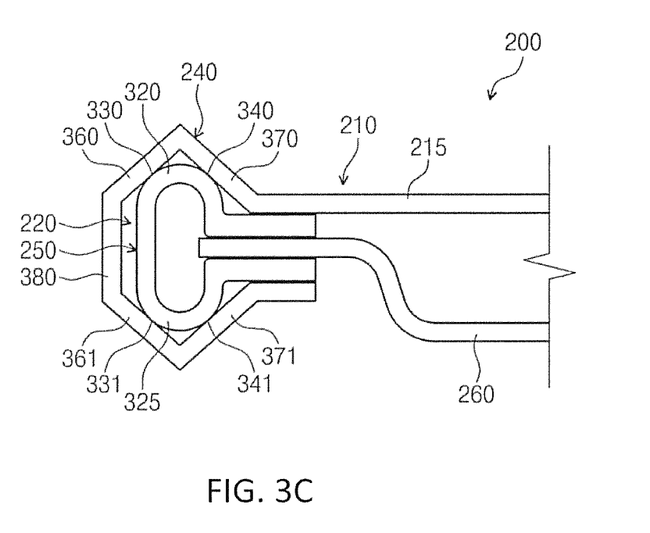
FIG. 3C is an assembled view of the guide rail and the sliding groove as referenced in FIG. 2.

Referring now to FIG. 2, FIG. 3B and FIG. 3C, the base portion 210 of the sliding mechanism 200 includes a panel 215, and a sliding groove 240 at one end 216 of the base portion 210 in a first direction or a width direction H of the floor console or the vehicle. The sliding groove 240 is formed with an opening 230. As shown in the figures, the opening 230 may be substantially disposed under the panel 215. The sliding groove 240 may define a cavity having an upper portion 350 and a lower portion 351 with the opening 30 as shown in FIG. 3B. In the depicted embodiment, the base portion 210 is shown as a one-piece structure formed integrally, that is, a single part. In other embodiments, the base portion 210 may be formed as several separate parts attached to each other. For example, the panel 215 and the sliding groove 240 may be formed separately and secured to each other. Such structure is advantageous in that the panel 215 and sliding groove 240 may be formed with different materials based on different strength requirements. For example, the panel 215 may include metal material to provide enhanced structural strength, and the sliding groove 240 may include polymer material to provide a low coefficient of friction.

Moreover, in the depicted embodiment, the panel 215 is shown as a flat plate. In other embodiments, the panel 215 may be of other shapes such as arched and bent shapes, and may include other structures such as a hole and a clip to connect to other vehicle structures such as sliding groove 240 or armrest 12.

Referring to FIG. 3B, the sliding groove 240 includes a first surface 360 and a second surface 370 positioned along the first direction H. The first surface 360 has a first angle α1 relative to the first direction H, and the second surface 370 has a second angle α2 relative to the first direction H. In some embodiments, the first direction H is substantially parallel to the panel 215. In other words, the first surface 360 and the second surface 370 may be not parallel to each other. In other words, the first and second angles α1 and α2 may be a non-zero value. In FIG. 3B, the first and second angles α1 and α2 are shown as substantially the same value, such that a more robust clamping force may be provided when the first and second surface 360, 370 abut against the first and second sides 330, 340 of the first sliding portion 320 of the guide portion 220. In other words, the first surface 360 and the second surface 370 may be symmetrical as relative to an axis substantially perpendicular to the first direction H. In other embodiments, the first and second angles α1 and α2 may be of different values due to the structure or package requirements. Further, one or both of angles α1 and α2 may be less than ninety degrees (90°), so that the first side 330 and/or second side 340 may be restrained in a second direction W, restricting the displacement of the guide rail 250 in the sliding groove 240 in direction W, and thus reducing the vibration and noise caused by the displacement.

Referring to FIG. 2, FIG. 3A and FIG. 3C, the guide portion 220 includes a guide rail 250 and an intermediate portion 260. The guide rail 250 is disposed along the first direction H, through the opening 230, and within the sliding groove 240. Specifically, the guide rail 250 may include a body 310 connected with the intermediate portion 260, and a guide rail upper side portion or first sliding portion 320 corresponding to the upper portion 350 of the sliding groove 240. The first sliding portion 320 may protrude from the body 310 along the second direction W different with the first direction H. As illustratively depicted in FIG. 3C, when the guide rail 250 is received within the sliding groove 240, the first surface 360 and the second surface 370 contact and enclose the first sliding portion 320. Specifically, the first sliding portion 320 may be formed with a first side 330 and a second side 340 opposing with each other. The first side 330 may be positioned adjacent and contacts the first surface 360, and the second side 340 may be positioned adjacent and contacts the second surface 370. As detailed herein elsewhere, the first surface 360 and the second surface 370 may be not parallel to the direction H, so that the first surface 360 may restrain the movement of the guide rail 250 in the first direction H, while the second surface 370 may restrain the movement of the guide rail 250 in a direction opposite to the first direction H.

Similarly, the guide rail 250 may include a lower side portion or second sliding portion 325 having a third side 331 and a fourth side 341 opposite to each other. The sliding groove 240 may also include a third surface 361 and a fourth surface 371 positioned along the first direction H. The third and fourth surfaces 361, 371 may contact and/or at least partially enclose the second sliding portion 325. In other words, the third side 331 may be positioned adjacent and substantially contacts the third surface 361, and the fourth side 341 may be positioned adjacent and substantially contacts the fourth surface 371. Similar to the first and second surfaces 360, 370, the third surface 361 may have a third angle α3 relative to the first direction H and the fourth surface 371 may have a fourth angle α4 relative to the first direction H, thus providing restraints to the second sliding portion 325 of the guide rail 250. Specifically, the third surface 361 may restrain the movement of the guide rail 250 in the first direction H, while the fourth surface 371 may restrain the movement of the guide rail 250 in a direction opposite to the first direction H. Further, one or both of the third angle α3 and the fourth angle α4 may be less than ninety degrees (90°) as needed, thus restraining the movement of the guide rail in a direction W. Similarly, the third surface 361 and the fourth surface 371 may be symmetrical relative to an axis substantially perpendicular to the first direction H. Optionally, in one or more embodiments, at least part of the cross-section of the guide rail 250 has an oval or a round shape, or any other regular or irregular shapes configured to be received in the sliding groove.

Moreover, the upper portion 350 and lower portion 351 of the sliding groove 240 may be symmetrical as relative to an axis substantially parallel to the first direction H. In some embodiments, such symmetrical structure may provide a more robust sliding mechanism.

Referring back to FIG. 2, in the depicted embodiment, the first surface 360 and the third surface 361 of the sliding groove 240 are positioned adjacent to the end 216 of the base portion 210, and the second surface 370 and the fourth surface 371 are positioned adjacent to the panel 215 of the base portion 210. In other words, the second surface 370 may be positioned between the first surface 360 and the panel 215 in direction H, and the fourth surface 371 may be positioned between the third surface 370 and the panel 215 in direction H.

Further referring to FIGS. 3B and 3C, in one or more embodiments, the sliding groove 240 may include an intermediate surface 380 connecting the first surface 360 and the third surface 361. The intermediate surface is positioned spaced apart from the guide rail along the first direction. Such configuration is advantageous because the guide rail 250 contacts the sliding groove 240 substantially via lines. As such, appropriate friction is provided while the manufacture costs can be reduced.

Referring to FIGS. 3B and 3C, the first surface 360 may have an angle β relative to the second surface 370 such that a connecting point of the first surface 360 and the second surface 370 is spaced apart from the guide rail 250. When the guide rail 250 is received within the sliding groove 240, the inner surface of the sliding groove 240 may not fully contact the corresponding surface of the guide rail 250. As described herein elsewhere, such structure is advantageous in that a substantial line contact may be established between the guide rail 250 and the sliding groove 240, providing suitable friction force.

As described herein elsewhere, in one or more embodiments, the guide portion 220 may include an intermediate portion 260. In the depicted embodiment, the intermediate portion 260 and the guide rail 250 may be formed separately and then coupled together, and thus may be made from different materials. Such structure is advantageous in that the intermediate portion 260 and the guide rail 250 may be formed with different materials based on different requirements. For example, the intermediate portion 260 may include metal material to provide enhanced supporting strength while the guide rail 250 may include polymer material to provide low coefficient of friction. Further, the intermediate portion 260 may include structures such as a hole, and a clip to connect to other vehicle structures such as the floor console body 11. Optionally, the guide rail 250 may be formed with resilient materials such as an elastic metal tab. In this way, after the guide rail 250 is assembled with the sliding groove 240, the guide rail 250 may better abut against the sliding groove 240 under recovery force, providing suitable friction effort.

Referring back to FIG. 2, in one or more embodiments, the base portion 210 may include two sliding grooves 240, 241 positioned at two ends of the panel 215. Opening 230 of the sliding groove 240 and opening 231 of the sliding groove 241 are opposite each other. Correspondingly, the guide portion 220 may include two guide rails 250, 251 which contact the intermediate portion 260 and are received within the two sliding grooves 240, 241. Further, the intermediate portion 260 may be substantially parallel to the panel 215. Such structure is advantageous in that the tolerance may be established in the direction "H" during manufacturing and assembling, thus reducing the assembling difficulty, enhancing sliding performance, and reducing or eliminating the vibration and noise issue. It is to be appreciated that one or more sliding grooves may be arranged in other positions of the base portion in different directions. For example, several sliding grooves may be provided in parallel for better supporting performance.

Figure 4:
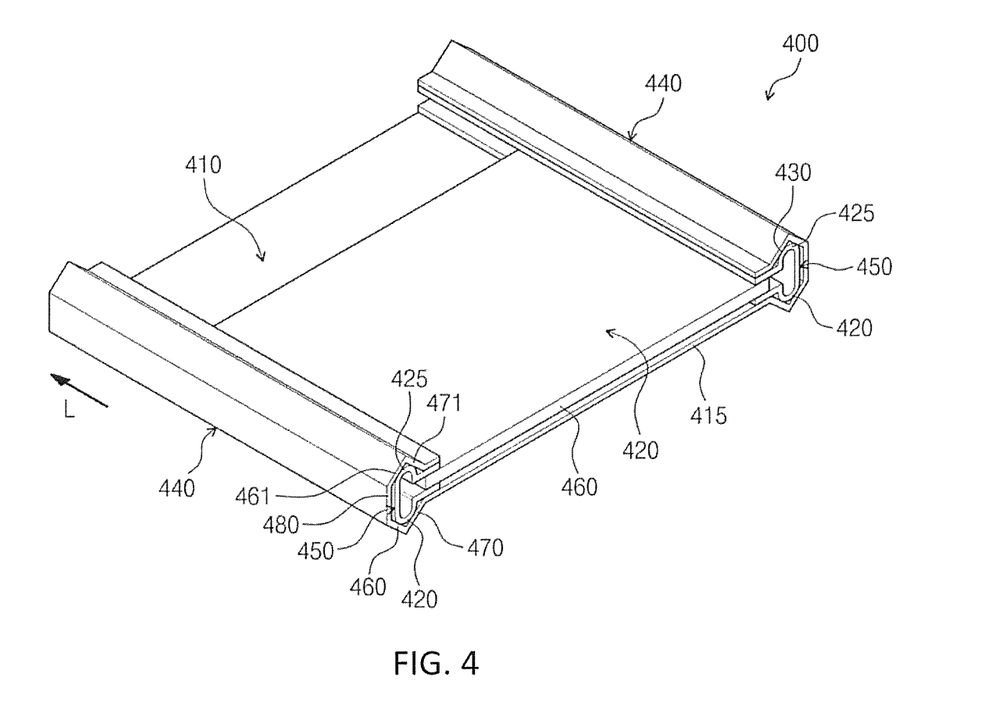
FIG. 4 is a perspective view of the sliding mechanism according to another embodiment of the present disclosure.

FIG. 4 illustratively depicts a perspective view of the sliding mechanism according to another embodiment of the present disclosure. For the sake of brevity, the same or similar parts described above will not be described below in detail. As shown in FIG. 4, the sliding mechanism 400 includes a base portion 410 and a guide portion 420. The base portion 410 may slide relative to the guide portion 420 along the longitudinal direction of the floor console.

The guide portion 420 includes a guide rail 450 slidably received within the sliding groove 440 and an intermediate portion 460. The intermediate portion 460 of the guide portion 420 is shown as a flat plate. It is to be appreciated that the intermediate portion 460 may be of any other suitable structure. The guide rail 450 may include a guide rail upper side portion or first sliding portion 420 and a guide rail lower side portion or second sliding portion 425. The first sliding portion 420 and the second sliding portion 425 may have a curved outer surface to facilitate the sliding movement between the sliding groove 440 and the guide portion 420. In the depicted embodiment, part of the first sliding portion 420 and the second sliding portion 425 are shown as substantially round.

The base portion 410 includes a panel 415 and a sliding groove 440 at its end. The sliding groove 440 may include a plurality of surfaces to restrain the movement of the guide portion 420 in the width direction and height direction of the floor console armrest. In one or more embodiments, the sliding groove 440 includes a first surface 460 and a second surface 470. The first surface 460 and the second surface 470 are positioned opposing with each other in the width direction of the armrest and form an angle therebetween. The first surface 460 and the second surface 470 may each be positioned adjacent to the guide rail upper side portion or the first sliding portion 420, such that the movement of the guide rail 450 in both width direction and height direction of the armrest may be restrained. The sliding groove 440 may include a third surface 461 and a fourth surface 471 which are positioned symmetrical with the first surface 460 and the second surface 470 separately. The third surface 461 and the fourth surface 471 may each be positioned adjacent to the guide rail lower side portion or the second sliding portion 425, such that the movement of the guide rail 450 in both width direction and height direction of the armrest may be restrained. In other words, the sliding groove 440 may restrain the movement of the guide rail 450 in four directions. In one or more embodiments, the sliding groove 440 may include a fifth surface 480 positioned between the first surface 460 and the third surface 461, which may be adjacent to or contact the guide rail 450. The sliding groove 440 may further include an opening for assembling the guide rail 450 into the sliding groove 440.

In one or more embodiments, the present disclosure provides a sliding mechanism for a vehicle floor console and a floor console sliding armrest assembly. One skilled in the art will readily recognize from such discussion, and from the accompanying drawings and claims that various changes, modifications and variations can be made therein without departing from the true spirit and fair scope of the invention as defined by the following claims.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A sliding mechanism for a vehicle floor console, comprising:
   a base portion including a panel and a sliding groove positioned at an end of the base-panel and comprising an opening;
   a guide portion comprising a guide rail positioned and slidable in the sliding groove; and
   an armrest secured to one of the base portion and guide portion, wherein the sliding groove includes first and second surfaces connected to each other and configured to at least partially enclose a first sliding portion of the guide rail, wherein the first and second surfaces are positioned along a first direction, wherein the first surface has a first angle relative the first direction and the second surface has a second angle relative to the first direction, and wherein the first direction is the width direction of the base portion, and at least one of the first angle and the second angle is less than ninety degrees (90°).

2. The sliding mechanism of claim 1, wherein the sliding groove includes a third surface and a fourth surface positioned along the first direction and opposite to the first and second surfaces, the third surface has a third angle relative to the first direction and the fourth surface has a fourth angle relative to the first direction, wherein the third surface and the fourth surface are connected to each other and are configured to at least partially enclose and contact a second sliding portion of the guide rail.

3. The sliding mechanism of claim 2, wherein the first surface and the third surface are positioned adjacent to the end of the base portion, the second surface and the fourth surface are positioned adjacent to the panel of the base portion, and wherein the sliding groove further includes an intermediate surface connecting the first surface and the third surface, and the intermediate surface is positioned spaced apart from the guide rail along the first direction.

4. The sliding mechanism of claim 1, wherein the first surface and the second surface are connected to form an angle and a connecting point is spaced apart from the guide rail.

5. The sliding mechanism of claim 1, wherein the guide portion includes an intermediate portion, the guide rail includes a body connected with the intermediate portion, the first sliding portion protrudes from the body along a second direction different from the first direction, the first sliding portion is formed with a first side and a second side opposite to the first side, and wherein the first side and the second side contact the first surface and the second surface of the sliding groove, respectively.

6. The sliding mechanism of claim 1, wherein the guide rail is a one-piece structure formed integrally.

7. The sliding mechanism of claim 6, wherein the guide rail is composed of resilient material.

8. The sliding mechanism of claim 1, wherein the base portion includes another sliding groove at another end of the panel, wherein the guide portion includes another guide rail received in the another sliding groove, and wherein an intermediate portion is connected with the two guide rails.

9. A floor console sliding armrest assembly for a vehicle, comprising:
   a floor console body;
   an armrest slidable relative to the floor console body; and
   a sliding mechanism connected with the floor console body and the armrest, including:
      a base portion including a panel and a sliding groove having an opening; and
      a guide portion including a guide rail secured to the floor console body and extending through the opening along a first direction substantially parallel to the panel and being slidably received within the sliding groove; wherein
      the sliding groove includes first and second surfaces having angles with the first direction, respectively, connected to each other and contacting a first side portion of the guide rail disposed inside the first and second surfaces.

10. A sliding mechanism for a vehicle floor console, comprising:
    a base portion including a panel and a sliding groove at the end of the panel, wherein the sliding groove includes a cavity having an upper portion and a lower portion and an opening under the panel, the upper portion includes a first surface and a second surface opposite to the first surface adjacent to the panel, and the first and second surfaces have an angle with the panel; and
    a guide portion including an intermediate portion and a guide rail received in the sliding groove and having a first side and a second side, wherein the first side is adjacent to the first surface of the sliding groove and the second side is adjacent to the second surface of the sliding groove;
    wherein the base portion is slidable along the guide portion, and the first surface of the sliding groove restricts movement of the guide rail along a first direction substantially parallel to the panel and the second surface of the sliding groove restricts movement of the guide rail along a direction opposite to the first direction, and the first surface and the second surface together restrict movement of the guide rail along a second direction substantially perpendicular to the first direction.

11. The sliding mechanism of claim 10, wherein the panel of the base portion is substantially parallel to the intermediate portion of the guide portion.

12. The sliding mechanism of claim 10, wherein the first side substantially contacts the first surface of the sliding groove and the second side substantially contacts the second surface of the sliding groove.

13. The sliding mechanism of claim 12, wherein the first surface and the second surface of the sliding groove are symmetrical as relative to an axis substantially perpendicular to the first direction.

14. The sliding mechanism of claim 13, wherein the lower portion of the sliding groove includes a third surface and a fourth surface opposite to the third surface and the fourth surface is positioned adjacent to the panel, and the third and fourth surfaces have an angle with the panel, wherein the guide rail includes a third side substantially contacting the third surface of the sliding groove and a fourth side substantially contacting the fourth surface of the sliding groove, and the third surface of the sliding groove restricts movement of the guide rail along the first direction and the fourth surface of the sliding groove restricts movement of the guide rail along the direction opposing to the first direction, and the third surface and the fourth surface together restrict the movement of the guide rail along the second direction.

15. The sliding mechanism of claim 14, wherein the third surface and the fourth surface of the sliding groove are symmetrical relative to an axis substantially perpendicular to the first direction.

16. The sliding mechanism of claim 15, wherein the upper portion and the lower portion of the sliding groove are symmetrical relative to an axis substantially parallel to the first direction.

17. The sliding mechanism of claim 16, wherein the sliding groove further includes an intermediate surface connecting the first surface and the third surface, and the intermediate surface is positioned spaced apart from the guide.

18. The sliding mechanism of claim 10, wherein the guide rail is a one-piece structure formed integrally.

19. The sliding mechanism of claim 10, wherein at least part of a cross section of the guide rail has an oval or a round shape.

* * * * *

UNITED STATES PATENT AND TRADEMARK OFFICE
CERTIFICATE OF CORRECTION

PATENT NO. : 10,391,906 B2
APPLICATION NO. : 15/433283
DATED : August 27, 2019
INVENTOR(S) : Mao et al.

It is certified that error appears in the above-identified patent and that said Letters Patent is hereby corrected as shown below:

In the Claims

Column 9; Claim 1, Line 5:
"base-panel" should be --panel--.

Signed and Sealed this
Twelfth Day of November, 2019

Andrei Iancu
*Director of the United States Patent and Trademark Office*